(12) United States Patent
Tasker (10) Patent No.: US 7,286,492 B1
(45) Date of Patent: Oct. 23, 2007

(54) PRIVATE BRANCH EXCHANGE (PBX) CONDITIONING METHOD AND APPARATUS

(75) Inventor: Michael E. Tasker, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 729 days.

(21) Appl. No.: 09/583,695

(22) Filed: May 31, 2000

(51) Int. Cl.
*H04L 12/66* (2006.01)

(52) U.S. Cl. ............. 370/271; 370/352; 370/463; 370/465; 379/88.25; 379/93.07; 379/216.01

(58) Field of Classification Search ........... 370/271, 370/352, 356, 395.1, 395.6, 395.64, 465, 370/93.01, 93.07, 211.01, 211.02, 213.01, 370/216.01, 88.18, 88.25, 266.09; 379/93.01, 379/93.07, 211.01, 211.02, 213.01, 216.01, 379/88.18, 88.25, 266.09
See application file for complete search history.

(56) References Cited

U.S. PATENT DOCUMENTS

| | | | | |
|---|---|---|---|---|
| 4,975,903 A | * | 12/1990 | Wakerly et al. | 370/365 |
| 5,463,672 A | * | 10/1995 | Kage | 455/458 |
| 5,602,846 A | * | 2/1997 | Holmquist et al. | 370/384 |
| 5,822,405 A | * | 10/1998 | Astarabadi | 379/88 |
| 5,889,845 A | * | 3/1999 | Staples et al. | 379/211 |
| 5,917,817 A | * | 6/1999 | Dunn et al. | 370/352 |
| 6,141,341 A | * | 10/2000 | Jones et al. | 370/352 |
| 6,389,276 B1 | * | 5/2002 | Brilla et al. | 455/413 |
| 6,430,176 B1 | * | 8/2002 | Christie, IV | 370/355 |
| 6,445,696 B1 | * | 9/2002 | Foodeei et al. | 370/356 |
| 6,563,918 B1 | * | 5/2003 | Nelson et al. | 379/230 |
| 6,574,239 B1 | * | 6/2003 | Dowling et al. | 370/469 |
| 6,700,956 B2 | * | 3/2004 | Chang et al. | 379/93.09 |
| 2003/0128819 A1 | * | 7/2003 | Lee et al. | 379/88.13 |

* cited by examiner

*Primary Examiner*—Chi Pham
*Assistant Examiner*—Shick Hom
(74) *Attorney, Agent, or Firm*—Marger Johnson & McCollom P.C.

(57) ABSTRACT

Method for maintaining a virtual presence of a first remote telephone user in a PBX system having a frame relay network connection between two endpoint routers while permitting the first remote user to make local calls includes first signaling a PBX to represent the remote telephone as being off hook; routing a telephone call placed at the remote telephone in accordance with a defined protocol; and when the routed telephone call is terminated, second signaling the PBX to restore the on-hook status of the remote telephone. Preferably, the first and second signaling are performed in-band, in accordance with an FRF. 11 or VToA AAL2 voice over packet protocol. The telephone call-routing may be to a public switched telephone network (PSTN) local to the remote telephone or it may be to another remote telephone user at the same site within the PBX system as the first remote telephone user. The signaling is to a PBX station interface associated with the PBX, so that the PBX in normal response refuses or stores incoming calls directed to the remote telephone for the call's duration. Apparatus includes a mechanism for selectively routing a telephone call placed at a PBX-connected telephone to the local PSTN; a mechanism for first signaling the PBX that the PBX-connected telephone is temporarily incapable of receiving calls; a mechanism for detecting a termination of such a PSTN-routed telephone call; and a mechanism responsive to the detecting mechanism for second signaling the PBX that the PBX-connected telephone again is capable of receiving calls.

20 Claims, 5 Drawing Sheets

PRIVATE BRANCH EXCHANGE (PBX) CONDITIONING METHOD AND APPARATUS

BACKGROUND OF THE INVENTION

The present invention relates to providing telephone service via PBX to remote phones, and more specifically to providing direct public switched telephone network (PSTN) service thereto.

Figure 1:
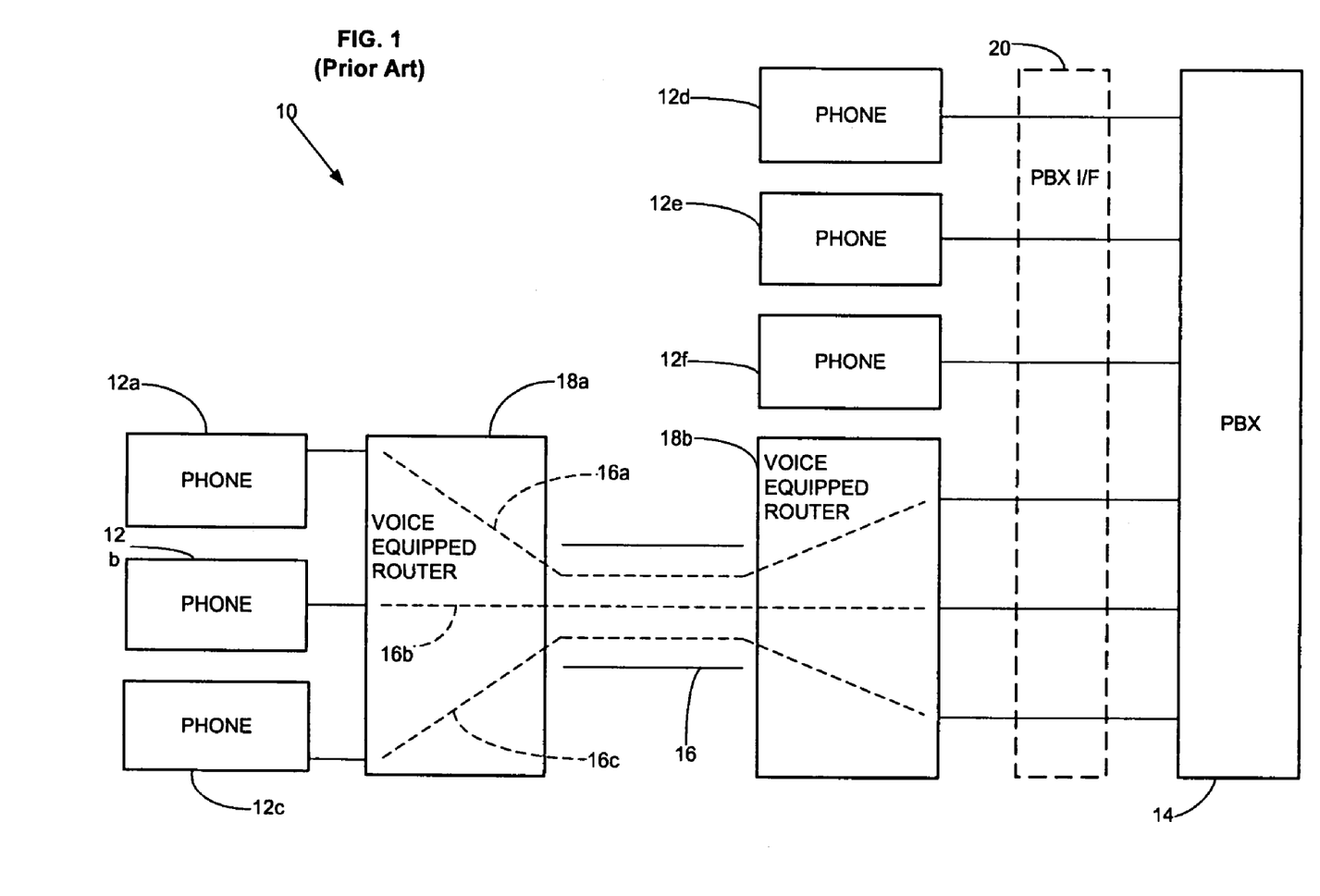
FIG. 1 is a system block diagram illustrating a conventional means for providing remote dedicated trunk connections between remote telephones and a private branch exchange (PBX).

FIG. 1 illustrates a prior art system 10 in which plural remote telephones 12a, 12b, 12c behave as if they are directly connected to a PBX 14. A frame relay network 16 and its individual FRF.11 (Frame Relay Forum implementation agreement 11, Voice over Frame Relay) trunk connections 16a, 16b, 16c between the remote phones 12a, 12b, 12c and PBX 14 enable remote phone use, for example, when a user is at home, e.g. an employee is telecommuting, or at a branch office. Voice-equipped routers 18a, 18b on either end of network 16 perform call routing, as is known. PBX 14 will be understood typically also to have plural local telephones 12d, 12e, 12f directly connected thereto via a PBX station interface indicated as a dashed outline 20 (typically a part of PBX 14). Those of skill in the art will appreciate that interface 20 maintains status bits indicating the status, e.g. on-hook or off-hook, do-not-disturb, busy, etc., for each PBX-connected phone.

Voice over packet technology (e.g. FRF.11 or Voice Telephony over ATM (VToA) AAL2 (ATM Adaptation Layer 2) trunks) enable the connection of remote telephones to standard PBX station interfaces in support of telecommuters and small branch offices that desire connections to a main corporate PBX. These connections are often implemented with a simple fixed point-to-point topology, as described above by reference to FIG. 1, such that the on-hook or off-hook status of the phone is simply replicated at the PBX station interface. This enables standard PBX features like forwarding a call to voicemail upon a busy signal or a ring-no-answer condition to continue to function as if the phone were still directly attached to the PBX. One disadvantage of this approach is that the remote phone on the remote user's desk can place calls only via the main PBX. If the remote user wishes to place calls via a local PSTN connection, then the user requires a second phone. Also, in the branch office case, calls between users at the branch office are routed via the central PBX and consume data bandwidth on the voice over packet connection between the branch site and the main site.

SUMMARY OF THE INVENTION

The invention involves a method for maintaining a virtual presence of a first remote telephone user in a PBX system having a frame relay network connection between two endpoint routers while permitting the first remote user to make local calls. The method includes first signaling a PBX to represent the remote telephone as being off hook; routing a telephone call placed at the remote telephone in accordance with a defined protocol; and when the routed telephone call is terminated, second signaling the PBX to restore the on-hook status of the remote telephone. Preferably, the first and second signaling are performed in-band, in accordance with an FRF.11 or VToA AAL2 voice over packet protocol. The telephone call-routing may be to a public switched telephone network (PSTN) local to the remote telephone or it may be to another remote telephone user at the same site within the PBX system as the first remote telephone user. The signaling is to a PBX station interface associated with the PBX, so that the PBX in normal response to the signaling either forwards incoming calls directed to the remote telephone to a voice mailbox or otherwise indicates in normal response thereto that the telephone is busy for the duration of the call.

The invented apparatus includes a mechanism for selectively routing a telephone call placed at a PBX-connected telephone to the local PSTN; a mechanism for first signaling the PBX that the PBX-connected telephone is temporarily incapable of receiving calls; a mechanism for detecting a termination of such a PSTN-routed telephone call; and a mechanism responsive to the detecting mechanism for second signaling the PBX that the PBX-connected telephone again is capable of receiving calls.

The foregoing and other objects, features and advantages of the invention will become more readily apparent from the following detailed description of a preferred embodiment which proceeds with reference to the drawings.

DETAILED DESCRIPTION OF THE PREFERRED EMBODIMENT

Figure 2:
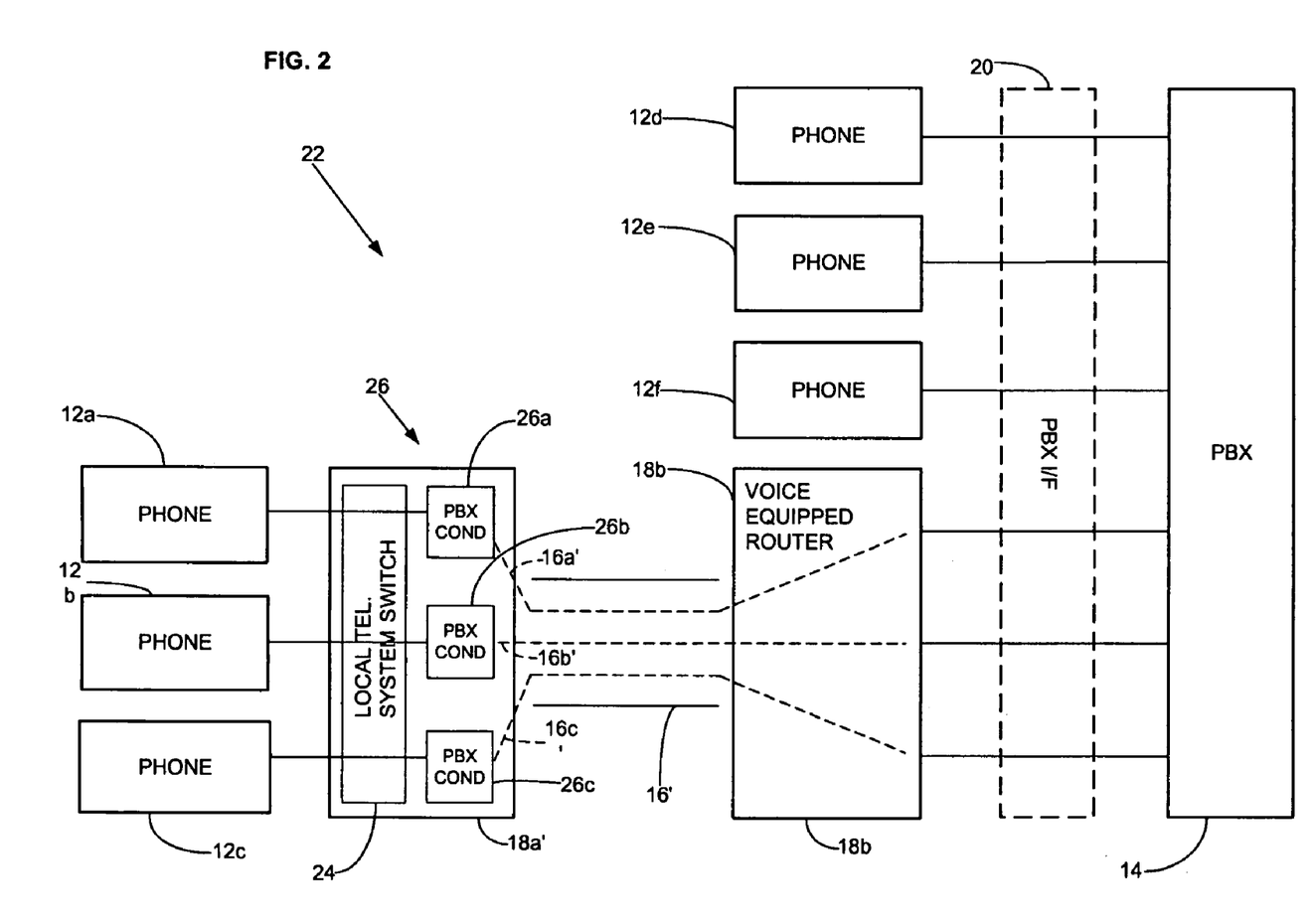
FIG. 2 is a system block diagram including a PBX conditioning system, in accordance with one embodiment of the invention.

FIG. 2 shows a first embodiment of the invented system, indicated generally at 22. Those of skill in the art will appreciate that features of invented system 22 shown in FIG. 2 that are identical with corresponding features of prior art system 10 in FIG. 1 are identically designated and operated, and thus will not be described again.

Invented system 22 may be seen to include a near-end voice-equipped router 18b, as in the prior art, connected directly to PBX 14. However, far-end voice-equipped router 18a' is different in that it provides a local telephony switching system 24 for local public switched telephone network (PSTN) connections from and to remote phones 12a, 12b, 12c. Also, system 22 includes within far-end router 18a' what will be referred to herein as a PBX conditioning system 26. PBX conditioning system 26 will be understood to be preferably implemented in software or firmware, although within the spirit and scope of the invention it may be implemented in any suitable form.

PBX conditioning system 26 is shown in FIG. 2 as taking the form of plural PBX conditioners 26a, 26b, 26c corresponding with phones 12a, 12b, 12c and FRF.11 trunk connections 16a, 16b, 16c, respectively. Those of skill in the art will appreciate that typically more (or, atypically, fewer) than three conditioners, phones and trunk connections may be provided, within the spirit and scope of the invention.

A typical one of plural PBX conditioners 26a, 26b, 26c now will be described by way of its behavior. When a call is placed by PBX 14 associated with the remote phone extension via the voice over packet trunk connection, it is automatically routed to the designated phone, e.g. phone 12a. In other words, a direct connection is emulated. When a remote user wishes to place a call, local router 18a' provides a dial tone and the user enters an access code (e.g. a single digit) to select either a connection to central PBX 14 or a local connection to PSTN 24. For example, the user might dial 9 to get a local PSTN connection or 8 to get a PBX connection. The user may also directly dial the extension number of a same site co-worker at the branch office, in which case the call is routed locally through the switching system inside data router 18a'. Those of skill in the art will appreciate that this bypass of PBX 14 and frame relay network 16 saves critical bandwidth.

In the case where the PBX access code is dialed, e.g. 8, the user is connected through the voice over packet trunk connection to the PBX onto the assigned station interface for the phone and receives a dial tone from central PBX 14. This behavior emulates the normal remote phone connection via an FRF.11 or VToA AAL2 trunk.

In the case where the user dials the local PSTN access code, e.g. 9, or the extension of a local co-worker, PBX conditioner 26a provides the needed local connection (via PSTN 24 within data router 18a'). In this case, PBX conditioner 26a also performs the following. When the remote phone is in use for a connection other than via central PBX 14, the conditioning system conditions PBX station interface 20 to indicate to the PBX that the remote phone is unavailable. Such conditioning may occur in any of a number of ways, in accordance with the invention.

Preferably, PBX conditioner 26a generates an off-hook indication at PBX station interface 20 to make the phone appear busy. This will trigger call attempts made by PBX 14 to invoke the forward on busy behavior (e.g. forward to voicemail).

Alternatively, PBX conditioner 26a may activate the do-not-disturb feature for the affected phone within station interface 20. This may be implemented as a sequence including a simple off-hook, followed by sending a simple (configurable) DTMF key sequence to PBX 14, then on-hook.

Alternatively, PBX conditioner 26a may activate the call-forward feature of PBX 14 and supply the phone number of a voicemail system associated with the PBX. Again, this may be implemented with a sequence including a simple off-hook, followed by a DTMF keying sequence, then on-hook. The DTMF sequence includes the phone number to which to forward calls.

Alternatively, PBX conditioner 26a may send a do-not-disturb or call-forward instruction to PBX 14 via alternative means such as a data signaling link. When the user has completed the local call and returned the phone on hook, the off-hook, do-not-disturb, or call forward conditioning at PBX station interface 20 is removed, i.e. on-hook status of the phone is restored.

All such preferable and alternative embodiments of the invention are contemplated, and are within the spirit and scope of the invention. Such signaling and conditioning as are described and illustrated herein preferably are in-band signaling and conditioning. This is because the existing hardware and software infrastructure and protocols preferably are used to affect the status of bits in the existing PBX station interface, without resort to external signaling or conditioning communication channels or mechanisms. Such in-band conditioning of PBX station interface 20 may be achieved entirely from far-end router 18a' by manipulating (or modifying) one or more of the FRF.11 or VToA AAL2 trunk connection status bits within PBX station interface 20, without modification of or extension to these standards. Alternatively, and yet within the spirit and scope of the invention, out-of-band signaling and conditioning may be used.

Figure 3:
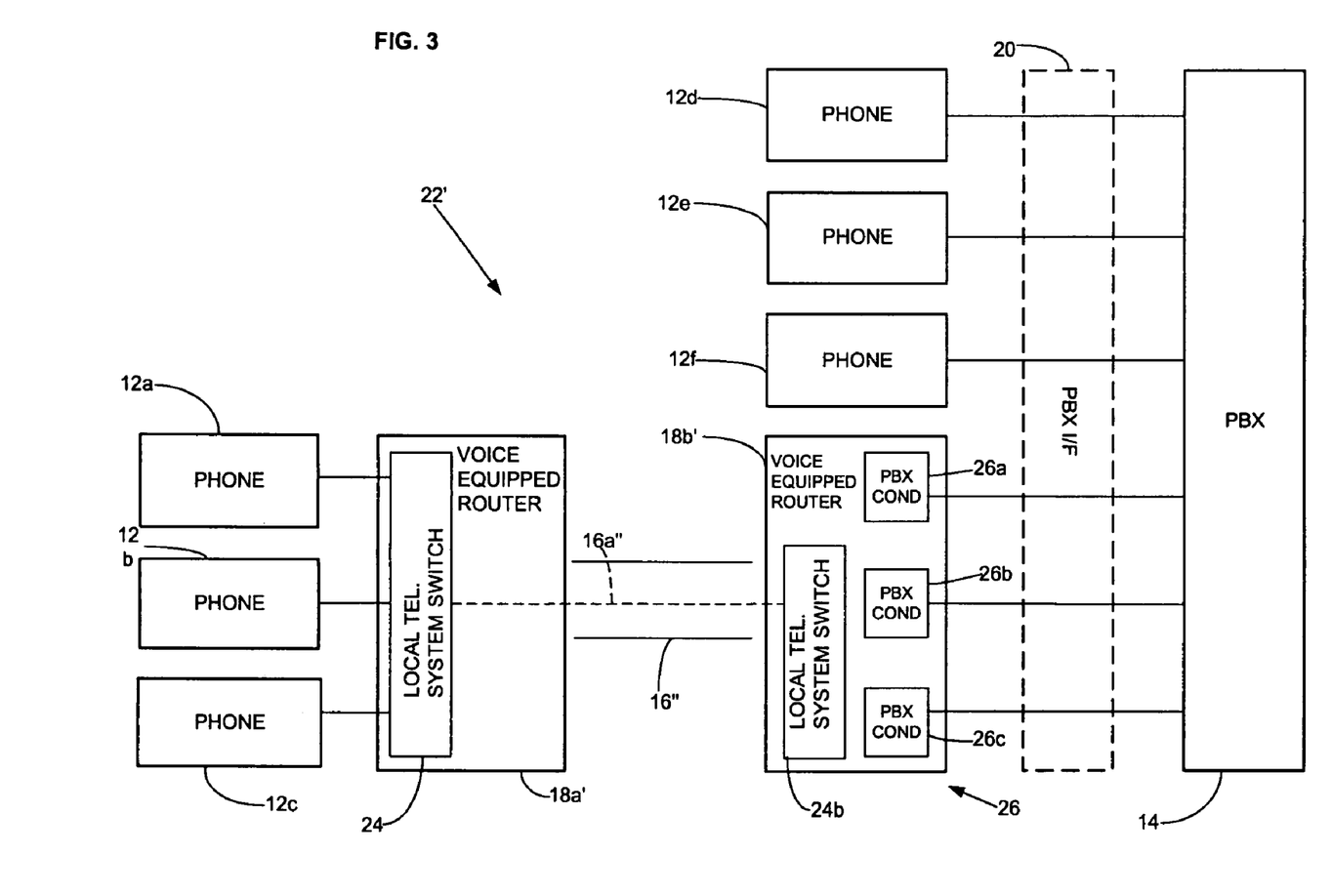
FIG. 3 is a system block diagram including the PBX conditioning system, in accordance with an alternative embodiment of the invention.

FIG. 3 shows an alternative embodiment of the invention in which a PBX conditioning system is more proximately, e.g. directly, connected with the PBX. Those of skill in the art will appreciate that features of the embodiment shown in FIG. 3 that are identical with those of FIG. 2 are identically designated and operated, and thus will not be described again.

In accordance with the alternative embodiment, the frame relay network connection is a voice over frame relay (VoFR) connection 16" carrying switched telephone calls (over VoFR trunk 16a" carrying plural switched voice signals) between two routers 18a' and 18b'. Routers 18a' and 18b' provide PSTN connections 24a, 24b, respectively, as indicated, and proximate router 18b' is the router that in accordance with this embodiment includes PBX conditioning system 26. As in the preferred embodiment, PBX conditioning system 26 preferably includes plural, e.g. three, PBX conditioners 26a, 26b, 26c corresponding with telephones 12a, 12b, 12c, respectively. PBX conditioners 26a, 26b, 26c function identically as described above by reference to FIG. 2. In other words, they signal and condition PBX station interface 20 to permit telephones 12a, 12b, 12c to place local calls via PSTN 24a while also maintaining a permanent virtual presence as though they were directly connected to PBX 14.

Figure 4:
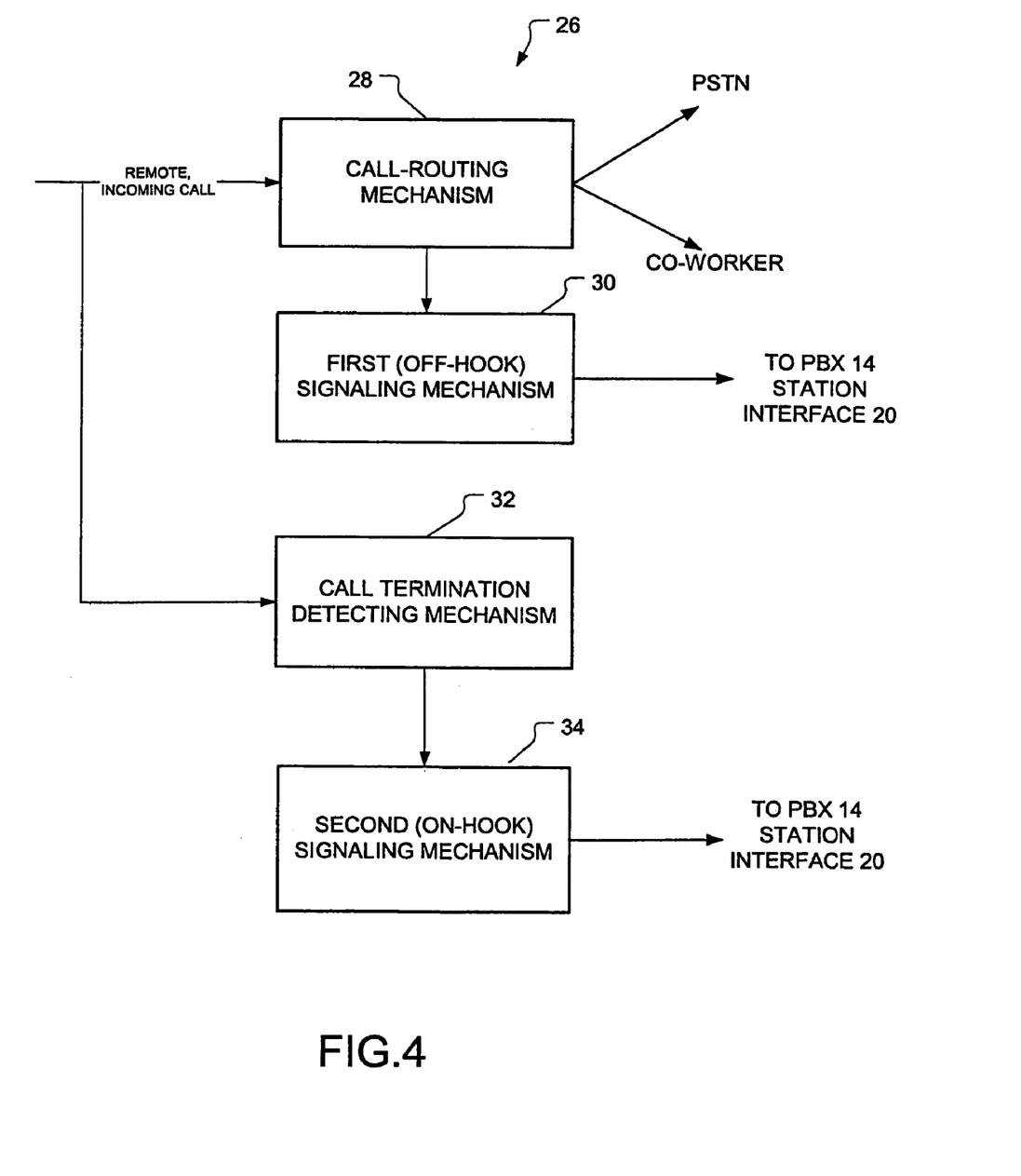
FIG. 4 is a simplified schematic block diagram of a PBX conditioning apparatus that forms a part of the PBX conditioning system, in accordance with a preferred embodiment of the invention.

FIG. 4 is a simplified schematic block diagram of PBX conditioning system or apparatus 26 in accordance with a preferred embodiment of the invention. Apparatus 26 will be understood to be for use in an endpoint router 18a or 18b having a PSTN connection 24 or 24b and a voice-equipped frame relay network connection 16' or 16", as described above by reference to FIGS. 2 and 3. Apparatus 26 may be seen to include a mechanism or means 28 for selectively routing a telephone call placed at a PBX-connected telephone, e.g. phone 12a, to the local PSTN 24 or 24b. (Those of skill will appreciate that, alternatively, the call may be routed to a same site co-worker who is connected to PBX 14 via the same router, as described above.) It may also be seen to include a mechanism or means 30 for signaling PBX 14 that the PBX-connected telephone is temporarily incapable of receiving calls. It includes a mechanism or means 32 for detecting a termination of such a PSTN-routed telephone call, as described above. Finally, it includes a mechanism or means 34 responsive to detecting mechanism 32 for signaling PBX 14 that the PBX-connected telephone again is capable of receiving calls, also as described.

Those of skill in the art will appreciate that the mechanisms or means described above and illustrated in FIG. 4 preferably are implemented in software or firmware within the respective router 18a' or 18b'. Preferably, plural operative instances of each mechanism are implemented for one or more of the routers on either end of a frame relay network 16' or 16". Alternatively, a single instance of software or firmware may implement the control mechanisms 26 for the plural frame relay network trunk connections 16a', 16b', 16c' or 16a". Any suitable software or firmware implementation, or a hardware-assisted or hardware-implemented alternative, are within the spirit and scope of the invention.

Figure 5:
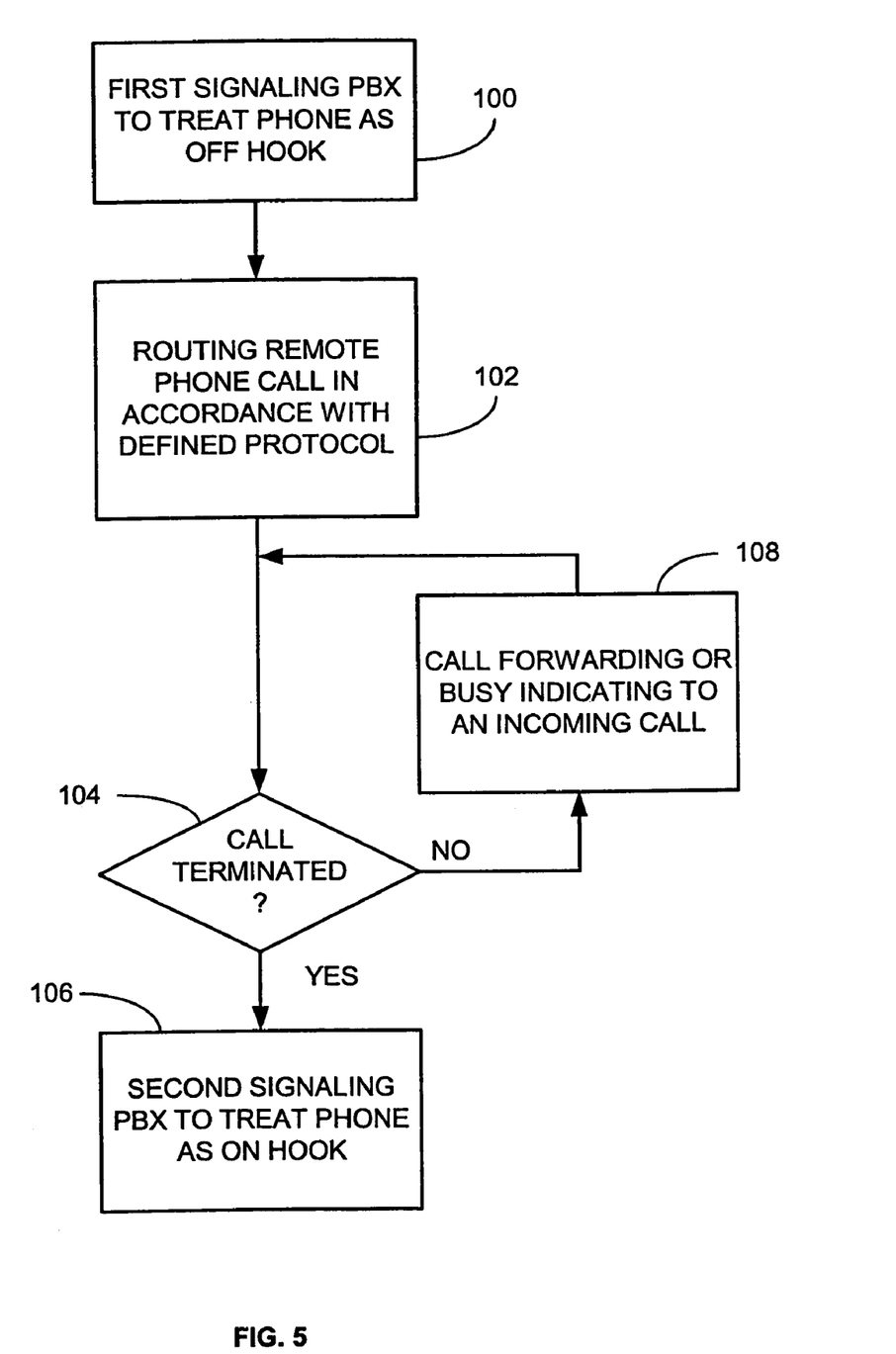
FIG. 5 is a flowchart illustrating a PBX conditioning method, in accordance with one embodiment of the invention.

Turning now to FIG. 5, the invented method will be described in more detail. The invented method involves a) at 100, first signaling a PBX to treat the remote telephone, and to represent the remote telephone to incoming callers, as being off hook; b) at 102, routing a telephone call placed at the remote telephone in accordance with a defined protocol; and c) at 104 and 106, when the routed telephone call is terminated, second signaling the PBX to restore the on hook status of the remote telephone. Those skilled in the art will appreciate that the first signaling, or conditioning, step is performed as described above preferably by a router 18a' or 18b', via in-band communication with PBX station interface 20.

Those of skill in the art will also appreciate that the treatment and representation of the remote telephone, e.g. telephone 12a, as being off hook may be accomplished by any of the above-described preferred and alternative methods. Thus off hook as used herein is used in its broadest possible sense. As such, off hook includes the case where PBX station interface 20 indicates busy, do-not-disturb or call forward-to-voicemail for the remote telephone. This off-hook signaling may or may not actually involve setting an explicit off-hook bit in the PBX station interface. Those of skill in the art also will appreciate that routing a call in accordance with a defined protocol may involve use of local PSTN 24 or 24a. Alternatively, the protocol may involve routing a call to another remote telephone user at the same site within the PBX system, e.g. phone 12b or 12c. Preferably, such signaling is performed in-band and is in accordance with an FRF.11 or VToA AAL2 voice over packet protocol, although alternative out-of-band signaling (using means external to frame relay network 16 and/or PBX station interface 20) in accordance with alternative frame relay network protocols are within the spirit and scope of the invention.

Referring still to FIG. 5, the method further may involve c) at 106, forwarding an incoming call directed to the remote telephone to a voice mailbox generally from the time when the first signaling (100) occurs to the time when the second signaling (104) occurs. In other words, for substantially the duration of the call placed on the remote telephone by the router, the PBX uses call forwarding for incoming calls to the remote telephone. Alternatively during the same period of time, the method further may involve c) also at 106, indicating in response to an incoming call directed to the remote telephone that the telephone is busy.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A method for maintaining a virtual presence of a first remote telephone user in a PBX system having a frame relay network connection between two endpoint routers while permitting the first remote user to make local calls, the method comprising:
   generating an off-hook indicator and transmitting the indicator to the PBX;
   routing a telephone call placed at a remote telephone in accordance with a defined protocol other than via the PBX while the off-hook indicator is active and the user is still connected to the PBX;
   transmitting a signal indicating that the phone is incapable of receiving calls;
   detecting when the routed telephone call is terminated; and
   transmitting a signal to removed the off-hook indicator from the PBX upon detection of termination.

2. The method of claim 1, wherein transmitting and removing are performed by in-band signaling.

3. The method of claim 2, wherein said in-band signaling is in accordance with a Voice over Frame Relay or Voice over ATM, ATM Adaptation Layer 2 voice over packet protocol.

4. The method of claim 1, wherein said telephone call-routing is to a public switched telephone network (PSTN) local to the remote telephone.

5. The method of claim 1, wherein said telephone call-routing is to another remote telephone user at the same site within the PBX system as the first remote telephone user.

6. The method of claim 4, wherein said call-routing to another remote same-site telephone user is performed by a router having the public switched telephone network (PSTN) local to the remote telephone and wherein said PSTN is used in said call-routing.

7. The method of claim 1 in which the frame relay network includes an Voice over Frame Relay or Voice over ATM, ATM Adaptation Layer 2 voice over packet trunk connection.

8. The method of claim 1 which further comprises:
   forwarding an incoming call directed to the remote telephone to a voice mailbox generally from a time when said transmitting occurs to a time when said removing occurs.

9. Private branch exchange (PBX) conditioning apparatus for use in an endpoint router having a local public switched telephone network (PSTN) connection and a voice-equipped frame relay network connection, the apparatus comprising:
   a mechanism for transmitting an off-hook indicator to the PBX that the PBX-connected telephone is temporarily incapable of receiving calls;
   a mechanism for selectively routing a telephone call placed at a PBX-connected telephone to the local PSTN other than via the PBX while the off-hook indicator is active and the user is still connected to the PBX;
   a mechanism for detecting a termination of such a PSTN-routed telephone call; and
   a mechanism responsive to said detecting mechanism for signaling the PBX to remove the off-hook indicator and that the PBX-connected telephone again is capable of receiving calls;
   said transmitting and signaling mechanisms including software instructions resident on a computer-readable medium that when executed by a processor modify one or more interface status bits in the PBX.

10. The apparatus of claim 9, wherein said routing mechanism is responsive to a predefined dialing sequence received from the PBX-connected telephone.

11. The apparatus of claim 9 which further comprises a mechanism for alternatively routing the telephone call placed at the PBX-connected telephone to a same site PBX-connected telephone.

12. The apparatus of claim 9, wherein said transmitting and signaling mechanisms are operatively coupled to a PBX station interface associated with the PBX.

13. Private branch exchange (PBX) conditioning apparatus for use in an endpoint router having a local public switched telephone network (PSTN) connection and a voice-equipped frame relay network connection, the apparatus comprising:

means for transmitting an off-hook indicator to the PBX that the PBX-connected telephone is temporarily incapable of receiving calls;

means for selectively routing a telephone call placed at a PBX-connected telephone to the local PSTN other than via the PBX while the off-hook indicator is active and the user is still connected to the PBX;

means for detecting a termination of such a PSTN-routed telephone call; and means responsive to said detecting means for signaling the PBX to remove the off-hook indicator and that the PBX-connected telephone again is capable of receiving calls.

14. The apparatus of claim 13, wherein said routing means is responsive to a predefined dialing sequence received from the PBX-connected telephone.

15. The apparatus of claim 13 which further comprises means for alternatively routing the telephone call placed at the PBX-connected telephone to a same site PBX-connected telephone.

16. The apparatus of claim 13, wherein a first and a second signaling means are operatively coupled to a PBX station interface associated with the PBX.

17. A computer-readable medium containing a program for maintaining a virtual presence of a first remote telephone user in a PBX system having a frame relay network connection between two endpoint routers while permitting the first remote user to make local calls, the program comprising:

instructions for first signaling an off-hook indicator to the PBX to represent a remote telephone as being off hook;

instructions for routing a telephone call placed at the remote telephone in accordance with a defined protocol other than via the PBX while the off-hook indicator is active and the user is still connected to the PBX;

instructions for signaling the PBX that the remote telephone is temporarily unable to receive calls;

instructions for detecting when the routed telephone call is terminated; and instructions for second signaling the PBX to remove the off-hook indicator and to restore the on-book status of the remote telephone.

18. The computer-readable medium in accordance with claim 17, wherein said instructions for first and second signaling are operative to perform in-band signaling in accordance with Voice over Frame Relay or Voice over ATM, ATM Adaptation Layer 2 voice over packet protocol.

19. The computer-readable medium in accordance with claim 17, wherein said call-routing instructions are operative to route the telephone call to a public switched telephone network (PSTN) local to the remote telephone.

20. The computer-readable medium in accordance with claim 17, wherein said call-routing instructions are operative to route the telephone call to another remote telephone user at the same site within the PBX system as the first remote telephone user.

* * * * *

UNITED STATES PATENT AND TRADEMARK OFFICE
CERTIFICATE OF CORRECTION

PATENT NO. : 7,286,492 B1
APPLICATION NO. : 09/583695
DATED : October 23, 2007
INVENTOR(S) : Tasker It is certified that error appears in the above-identified patent and that said Letters Patent is hereby corrected as shown below:

Column 6, line 17, the word "removed" should be replaced with --remove--;

Column 8, line 20, the word "on-book" should be replaced with --on-hook--.

Signed and Sealed this

Eighth Day of April, 2008

JON W. DUDAS
*Director of the United States Patent and Trademark Office*